US009305516B1

(12) United States Patent
Suzuki

(10) Patent No.: US 9,305,516 B1
(45) Date of Patent: Apr. 5, 2016

(54) ELECTRONIC DEVICE

(71) Applicant: Kabushiki Kaisha Toshiba, Minato-ku, Tokyo (JP)

(72) Inventor: Nobuaki Suzuki, Akishima Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 14/683,476

(22) Filed: Apr. 10, 2015

Related U.S. Application Data

(60) Provisional application No. 62/053,046, filed on Sep. 19, 2014.

(51) Int. Cl.
*H04N 7/00* (2011.01)
*H04N 5/38* (2006.01)
*H04N 5/44* (2011.01)
*G09G 5/00* (2006.01)
*H04N 21/4363* (2011.01)
*H04N 21/41* (2011.01)

(52) U.S. Cl.
CPC ............ *G09G 5/006* (2013.01); *H04N 21/4104* (2013.01); *H04N 21/43635* (2013.01); *G09G 2370/06* (2013.01); *G09G 2370/12* (2013.01); *G09G 2370/20* (2013.01); *G09G 2370/22* (2013.01)

(58) Field of Classification Search
CPC .............. H04N 21/43635; H04N 5/38; H04N 21/4122; H04N 21/4104; H04N 21/436; H04N 21/4367; H04N 7/163; H04N 5/4401; H04N 5/44; H04N 5/44543; G09G 2370/20; G09G 2370/06; G09G 2370/12; G09G 2370/22; G09G 5/006; G06F 3/14; G06F 13/4221

USPC ........ 348/725, 723, 552; 725/67, 68, 98, 100, 725/118, 131, 133, 134, 139, 141, 142, 148, 725/151, 153
IPC ............................ H04N 5/38,5/44, 7/00, 11/00
See application file for complete search history.

(56) References Cited

U.S. PATENT DOCUMENTS 8,284,312 B2   10/2012  Suzuki
2011/0292295 A1*  12/2011  Kawai ..................... H04N 5/38
                                                                    348/723

FOREIGN PATENT DOCUMENTS

JP    2008-109219 A    5/2008
JP    2008-158220 A    7/2008
JP    2013-009422 A    1/2013

* cited by examiner

*Primary Examiner* — Sherrie Hsia
(74) *Attorney, Agent, or Firm* — Knobbe, Martens Olson & Bear LLP

(57) ABSTRACT

According to one embodiment, an electronic device comprises, as an example, a memory, a receiver, and a transmitter. The memory is configured to store therein first extended display identification data (EDID) and second EDID comprising a different version of the High-Definition Multimedia Interface (HDMI) from the first EDID. The receiver is configured to receive a video signal from another electronic device. The transmitter is configured to send the first EDID comprising an identification bit to the another electronic device, the another electronic device being configured to respond to the identification bit when the another electronic device supports the version of the HDMI of the second EDID, and to send the second EDID to the another electronic device when the receiver has received a response corresponding to the identification bit from the another electronic device.

8 Claims, 8 Drawing Sheets

FIG.4

| Byte # | 7 | 6 | 5 | 4 | 3 | 2 | 1 | 0 |
|---|---|---|---|---|---|---|---|---|
| 0 | Vendor-specific tag code (=3) | | | Length (=N) | | | | |
| 1 | 24-bit IEEE Registration Identifier (0xXXXX)<br>(least significant byte first) | | | | | | | |
| 2 | | | | | | | | |
| 3 | | | | | | | | |
| 4 | HDMI ADVANCED FEATURE SUPPORT BIT | Rsvd (0) | Rsvd (0) | Rsvd (0) | Rsvd (0) | Rsvd (0) | Rsvd (0) | Rsvd (0) |

| Packet Byte # | 7 | 6 | 5 | 4 | 3 | 2 | 1 | 0 |
|---|---|---|---|---|---|---|---|---|
| PB0 | Checksum | | | | | | | |
| PB1 | 24bit IEEE Registration Identifier (0xXXXXX)<br>( least significant byte first ) | | | | | | | |
| PB2 | | | | | | | | |
| PB3 | | | | | | | | |
| PB4 | HDMI ADVANCED FEATURE SUPPORT BIT | Rsvd (0) | Rsvd (0) | Rsvd (0) | Rsvd (0) | Rsvd (0) | Rsvd (0) | Rsvd (0) |

501

ELECTRONIC DEVICE

CROSS-REFERENCE TO RELATED APPLICATION

This application claims the benefit of U.S. Provisional Patent Application No. 62/053,046, filed Sep. 19, 2014, the entire contents of which are incorporated herein by reference.

FIELD

Embodiments described herein relate generally to an electronic device.

BACKGROUND

Conventionally, when devices are connected to each other in conformity with the High-Definition Multimedia Interface (HDMI) standard, a source device (such as an optical disc reproducing device) first receives extended display identification data (EDID) of a sink device (such as a television display device) to know the capability of the sink device, and then sends video and sound signals suitable for the sink device. The HDMI standard has been subjected to, for example, version upgrades to expand functions in accordance with improvements in computer technologies and requirement of the devices.

The HDMI standard is defined so as to be compatible between different versions. However, there can be devices that are not designed as specified by the HDMI standard, or cases in which improvement in performance makes it difficult to fully maintain interconnectivity between the devices.

BRIEF DESCRIPTION OF THE DRAWINGS

A general architecture that implements the various features of the invention will now be described with reference to the drawings. The drawings and the associated descriptions are provided to illustrate embodiments of the invention and not to limit the scope of the invention.

FIG. 4 is an exemplary diagram illustrating an example of EDID stored in an HDMI 1.x VSDB of the first embodiment;

FIG. 5 is an exemplary diagram illustrating an InfoFrame included in a video signal sent by a TMDS encoder of the first embodiment;

DETAILED DESCRIPTION

In general, according to an embodiment, an electronic device comprises a memory, a receiver, and a transmitter. The memory is configured to store therein first extended display identification data (EDID) and second EDID comprising a different version of the High-Definition Multimedia Interface (HDMI) from the first EDID. The receiver is configured to receive a video signal from another electronic device. The transmitter is configured to send the first EDID comprising an identification bit to the another electronic device, the another electronic device being configured to respond to the identification bit when the another electronic device supports the version of the HDMI of the second EDID, and to send the second EDID to the another electronic device when the receiver has received a response corresponding to the identification bit from the another electronic device.

The following describes embodiments based on the drawings. In the embodiments illustrated below, an example will be described in which the electronic device is used in a video display device as an example.

Figure 1:
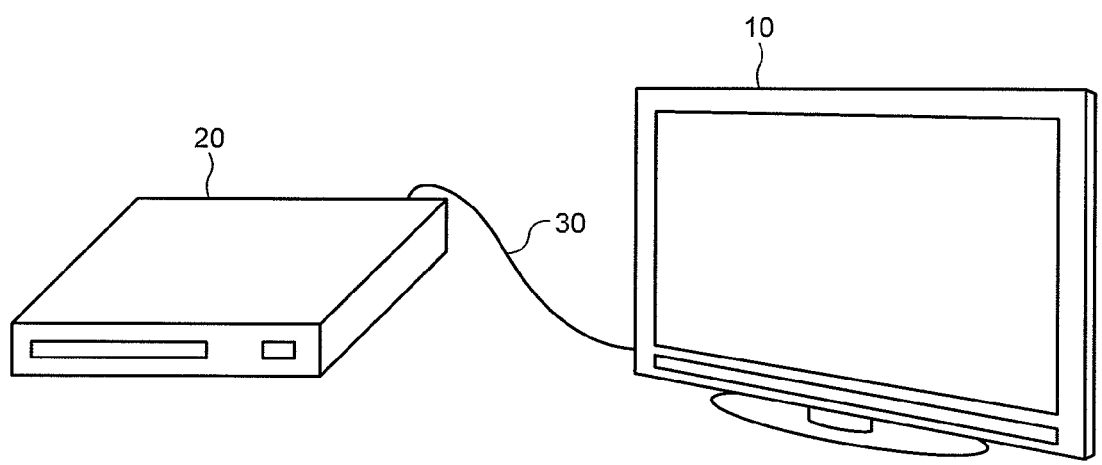
FIG. 1 is an exemplary external view illustrating a connection example between a video display device and a video transmission device according to a first embodiment.

FIG. 1 is an external view illustrating a connection example between a video display device 10 and a video transmission device 20 according to a first embodiment of the present invention. As illustrated in FIG. 1, the video display device 10 is connected to the video transmission device 20, for example, via an HDMI cable 30.

The video display device 10 complies with the HDMI standard, and is called a sink device comprising an HDMI input terminal. The video display device 10 of the present embodiment supports the advanced features of the HDMI (such as the HDMI 2.x).

To send the EDID, the video display device 10 comprises a vendor specific data block (VSDB) supporting the HDMI 2.x and a VSDB supporting the HDMI 1.x. This configuration allows the video display device 10 to send the EDID based on the HDMI 1.x and the EDID based on the HDMI 2.x.

The video transmission device 20 complies with the HDMI standard, reproducing a video recorded on a medium, such as an optical disc (for example, a Blu-ray Disc), and sending the video to the video display device 10 via the HDMI cable 30. The video transmission device 20 of the present embodiment supports the advanced features of the HDMI (such as the HDMI 2.x). The video transmission device 20 can normally identify and process either of the EDID based on the HDMI 1.x and the EDID based on the HDMI 2.x sent to the video transmission device 20. This capability allows the video transmission device 20 to convert the reproduced video into a video that can be displayed by the video display device 10 based on the EDID received from the video display device 10, and to send the converted video to the video display device 10.

Some conventional video transmission devices do not support a standard (such as the HDMI 2.x) represented as the advanced features, and can identify only the HDMI 1.x, which is a conventionally used standard. Sending the EDID supporting the advanced features from a device that has the advanced features (such as the HDMI 2.x) to such a conventional device that cannot identify the advanced features can cause adverse effects on an operation of the conventional device.

As a detailed example, when the EDID supporting the advanced features (such as the HDMI 2.x) is sent to a video transmission device that does not support the advanced features (supports only the HDMI 1.x), the video transmission device could erroneously process the EDID, and could thereby fail to operate as specified by the standard.

Hence, the present embodiment proposes the video display device 10 that inhibits abnormal operations when the video display device 10 is connected to a video transmission device not compliant with the above-described specification, and that allows video signals processed using the advanced features to be received when the video display device 10 is connected to a video transmission device supporting the advanced features (such as the HDMI 2.x).

Figure 2:
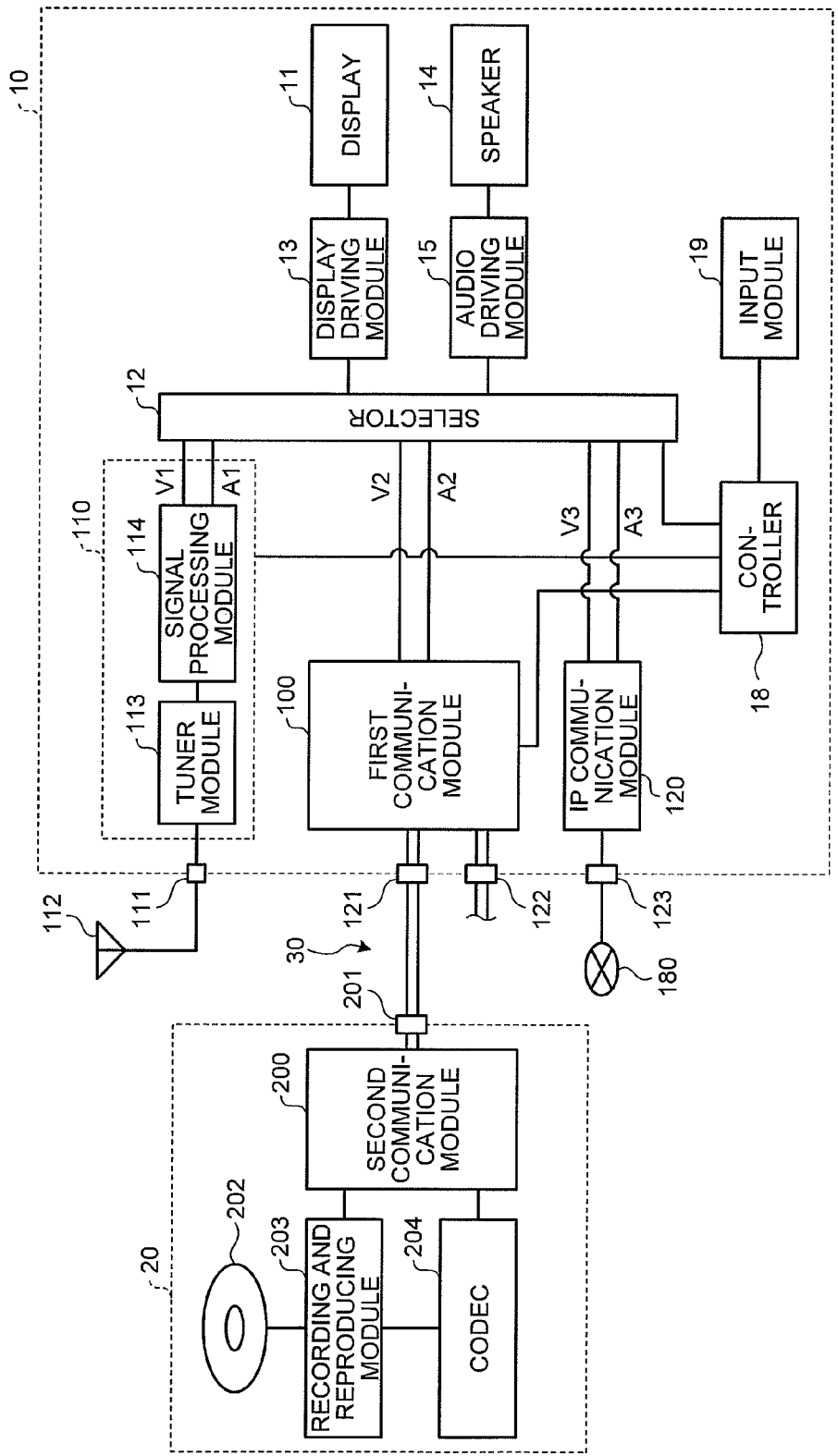
FIG. 2 is an exemplary block diagram illustrating configurations of the video display device and the video transmission device of the first embodiment.

FIG. 2 is a block diagram illustrating the configurations of the video display device 10 and the video transmission device 20. As illustrated in FIG. 2, the video display device 10 comprises a television function module 110, a first communication module 100, a selector 12, a display 11, a display driving module 13, a speaker 14, an audio driving module 15, a controller 18, and an input module 19.

The television function module 110 comprises a tuner module 113 and a signal processing module 114, and receives television broadcast signals. The tuner module 113 receives the television broadcast signals using an antenna 112 connected to a television (TV) input terminal 111, and extracts a signal of a predetermined channel. The signal processing module 114 applies input processing to the signal extracted by the tuner module 113, and converts the signal into a video signal V1 and an audio signal A1.

An IP communication module 120 receives an IP broadcast including video signals from a public network 180 connected thereto via a connector 123. Examples of services received as the IP broadcast include, but are not limited to, video on demand services.

The input module 19 accepts input of, for example, setting operations for the video display device 10.

The controller 18 controls the modules of the video display device 10. For example, when the input module 19 has accepted input of a setting operation, the controller 18 controls the modules according to the setting operation.

The selector 12 selects target output source from the television function module 110, the first communication module 100, and the IP communication module 120. For example, when the input module 19 has accepted an "input switch" operation, the selector 12 follows the control from the controller 18 to switch the target output source of a video between the television function module 110, the first communication module 100, and the IP communication module 120.

The selector 12 of the present embodiment selectively switches the video and the audio signals V1 and A1 output from the television function module 110, video and audio signals V2 and A2 output from the first communication module 100, and video and audio signals V3 and A3 output from the IP communication module 120, and outputs the selected video and audio signals to the display driving module 13 and the audio driving module 15. If the first communication module 100 is connected to a plurality of video transmission devices via a plurality of HDMI ports (connectors) 121 and 122, the selector 12 can select an output source of the video and the audio signals V2 and A2 from the video transmission devices.

In this manner, the video display device 10 of the present embodiment is provided with a plurality of connection interfaces (the input terminal 111, the HDMI ports 121 and 122, and the connector 123) for receiving the video signals.

Based on a video signal output by the selector 12, the display driving module 13 drives the display 11 to display a video. Based on an audio signal output by the selector 12, the audio driving module 15 drives the speaker 14 to output a sound.

The first communication module 100 receives a digital video signal conforming to the HDMI standard. The first communication module 100 separates the digital video signal conforming to the HDMI standard received from the video transmission device 20 connected to the HDMI port 121 (or the HDMI port 122) via the HDMI cable 30 into a video component and an audio component, and outputs the components as the video signal V2 and the audio signal A2.

The video transmission device 20 comprises a second communication module 200, a recording and reproducing module 203, and a codec 204. The recording and reproducing module 203 performs recording and reproduction with respect to a record medium 202, such as a DVD or a Blu-ray Disc. The codec 204 MPEG-decodes encoded data supplied from the recording and reproducing module 203 into baseband video and audio signals, and outputs the baseband video and audio signals to the second communication module 200.

The second communication module 200 performs communication with the video display device 10 via the HDMI cable 30 connected to the HDMI port 201. For example, the second communication module 200 performs control to send the video and audio signals received from the codec 204 to the video display device 10.

Figure 3:
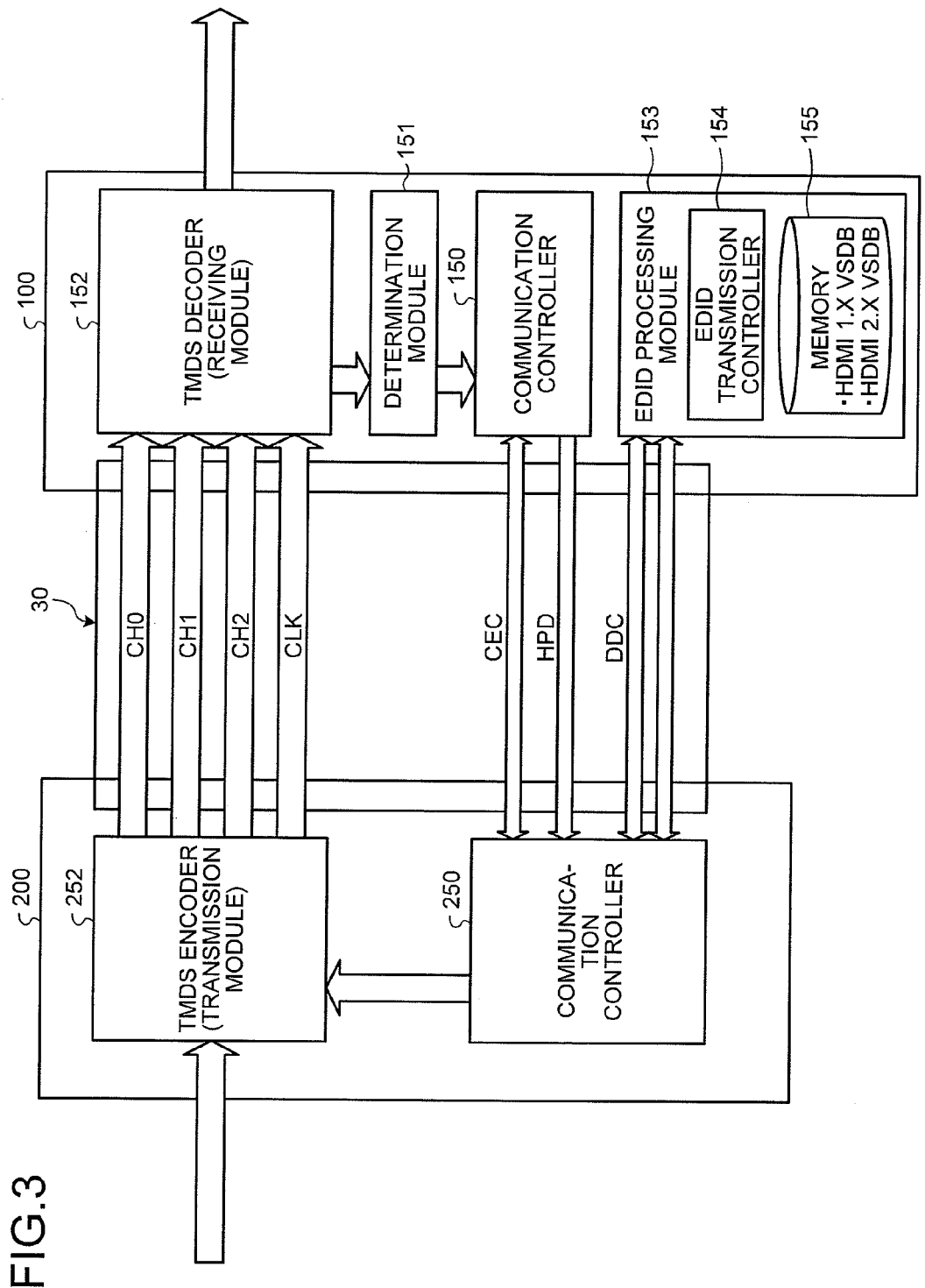
FIG. 3 is an exemplary block diagram illustrating configurations of a first communication module of the video display device and a second communication module of the video transmission device in the first embodiment.

FIG. 3 is a block diagram illustrating the configurations of the first communication module 100 of the video display device 10 and the second communication module 200 of the video transmission device 20.

The second communication module 200 comprises a communication controller 250 and a transition minimized differential signaling (TMDS) encoder (transmission module) 252. The communication controller 250 performs communication of signals, such as consumer electronics control (CEC) signals and hot-plug-detect (HPD) signals, with the video display device 10.

The first communication module 100 comprises a communication controller 150, a TMDS decoder (receiving module) 152, a determination module 151, and an EDID processing module 153.

The communication controller 150 performs communication of signals, such as the CEC signals and the HPD signals, with the video transmission device 20.

The TMDS encoder 252 receives the video data generated by the recording and reproducing module 203 and the codec 204, converts the received video data so as to send the received video data to the video display device 10, and outputs the result. The video data is transmitted via CH0 to CH2.

The TMDS decoder 152 decodes the received data into video data, and outputs the result to the selector 12.

The communication controller 250 of the video transmission device 20 is connected to the communication controller 150 of the video display device 10 by a CEC line and an HPD line. The communication controller 250 and the communication controller 150 transmit information for performing mutual control between devices via the CEC line. The CEC line bidirectionally transmits, for example, CEC commands and CEC command groups. The communication controller 250 notifies the video transmission device 20 via the HPD line that a signal is ready to be transmitted in response to completion of power-on of the video display device 10.

The communication controller 250 is connected to the EDID processing module 153 of the video display device 10 via DDC lines. The communication controller 250 reads the EDID from a memory 155 of the EDID processing module 153.

The EDID processing module 153 comprises an EDID transmission controller 154 and the memory 155.

The memory 155 stores therein the HDMI 1.x VSDB and the HDMI 2.x VSDB. The HDMI 1.x VSDB and the HDMI 2.x VSDB store therein the EDID representing capabilities of the video display device 10, such as a format that the video display device 10 can use.

The HDMI 1.x VSDB stores therein the EDID compatible with the version 1.x. The HDMI 2.x VSDB stores therein the EDID compatible with the version 2.x. While the present embodiment is described by way of an example in which the VSDBs store therein the EDID compatible with the version 1.x and the EDID compatible with the version 2.x, the VSDBs only need to store therein first EDID with a version identifiable by various devices and second EDID that has advanced features and differs in the version from the first EDID.

FIG. 4 is a diagram illustrating an example of the EDID stored in the HDMI 1.x VSDB. As illustrated in FIG. 4, the HDMI 1.x VSDB stores therein a "Vendor-specific tag code", a "Length", and a "24-bit IEEE Registration Identifier". Furthermore, an HDMI advanced feature support bit 401 is assigned in any region in a reserved area. The HDMI advanced feature support bit 401 is the identification bit set so that, if the advanced features of the EDID standard (such as the EDID compatible with the version 2.x) are supported, a response is made to the video display device 10 with a video signal including information indicating that the advanced features are supported.

Specifically, if the EDID is first read from the communication controller 250 via the DDC lines after the power supply is turned on, the EDID transmission controller 154 of the present embodiment sends the EDID compatible with the version 1.x stored in the HDMI 1.x VSDB to the video transmission device 20. In the EDID thus sent, the HDMI advanced feature support bit 401 is set to "ON" (such as 1).

As a result, when the communication controller 250 of the video transmission device 20 has received the EDID compatible with the version 1.x, the communication controller 250 commands the codec 204 to decode the EDID into a video signal in accordance with the EDID, and, if the HDMI advanced feature support bit 401 is set to "ON" (such as 1), notifies the TMDS encoder 252 of information indicating that the HDMI advanced feature support bit 401 is set to "ON".

When the video signal is received from the codec 204, the TMDS encoder 252 sets an HDMI advanced feature support bit (HDMI advanced feature support bit 501 in FIG. 5) provided in an InfoFrame embedded in the video signal to "ON" (such as 1), and sends the video signal to the video display device 10. The InfoFrame is stored in a blanking region in each video frame.

FIG. 5 is a diagram illustrating the InfoFrame included in the video signal sent by the TMDS encoder 252 of the present embodiment. As illustrated in FIG. 5, the InfoFrame is assigned with a "Checksum" and a "24 bit IEEE Registration Identifier", and also assigned with the HDMI advanced feature support bit 501 in any region in a reserved area. The HDMI advanced feature support bit 501 is in the region assigned to be used for the response to the HDMI advanced feature support bit 401 of the EDID. For example, if the HDMI advanced feature support bit 401 of the EDID is set to "ON" (such as 1), the TMDS encoder 252 also sets the HDMI advanced feature support bit 501 of the InfoFrame to "ON" (such as 1), and sends the InfoFrame to the video display device 10. This operation allows the video display device 10 to determine that the video transmission device 20 supports the advanced features (is compatible with the HDMI 2.x in the present embodiment).

In other words, conventionally, although the EDID sent by the video display device allows the video transmission device to know the capability of the video display device, the video display device cannot know in what format the EDID can be identified by the video transmission device. In contrast, in the present embodiment, using the HDMI advanced feature support bits 401 and 501 allows the video display device 10 to know whether the video transmission device 20 supports the advanced features of the EDID.

Specifically, if the conventional video transmission device does not support the HDMI advanced feature support bit, in other words, does not support the HDMI advanced features (such as the HDMI 2.x), the conventional video transmission device cannot identify the HDMI advanced feature support bit 401 assigned in the reserved area of the EDID. Accordingly, when sending the video signal, the conventional video transmission device sends the InfoFrame with the reserved area thereof set to an initial value (such as 0). Specifically, the conventional video transmission device sends the video signal with the HDMI advanced feature support bit 501 of the InfoFrame set to "OFF".

This operation allows the video display device 10 to know whether the video transmission device 20 supports the HDMI advanced features by referring to the HDMI advanced feature support bit 501 of the InfoFrame.

Specifically, after the TMDS decoder 152 receives the video signal, the determination module 151 determines whether the HDMI advanced feature support bit 501 included in the InfoFrame of the video signal is "ON" (such as 1). If the HDMI advanced feature support bit 501 is "OFF" (such as 0, which is the initial value of the reserved area), the video transmission device 20 is determined to not support the HDMI compatible with the HDMI 2.x, so that the video signal continues to be received in a compatible manner with the HDMI 1.x.

If the determination module 151 determines that the HDMI advanced feature support bit 501 is "ON" (such as 1), the determination module 151 notifies the communication controller 150 and the EDID processing module 153 that the video transmission device 20 supports the advanced features.

When the notification indicating that the video transmission device 20 supports the advanced features is received, the EDID transmission controller 154 of the EDID processing module 153 switches the VSDB serving as a reading source from the HDMI 1.x VSDB to the HDMI 2.x VSDB.

The communication controller 150 reconnects the communication with the video transmission device 20 using the HPD line (HPD function). When the EDID processing module 153 has received again a read request for the EDID from the video transmission device 20 after the reconnection, the EDID transmission controller 154 sends the EDID supporting the advanced features (compatible with the HDMI 2.x) to the video transmission device 20 because the EDID processing module 153 had received the response corresponding to the advanced feature support bit 401 (the advanced feature support bit 501 of the InfoFrame in the video signal) of the EDID before the reconnection.

This operation allows the video transmission device 20 to know the capability of the video display device 10 based on the HDMI 2.x. Specifically, the TMDS decoder 152 receives a video signal that includes the response (advanced feature support bit 501) corresponding to the advanced feature support bit 401 in the InfoFrame and that is in accordance with the sent EDID compatible with the HDMI 1.x; then, after the reconnection, the EDID transmission controller 154 sends the EDID compatible with the HDMI 2.x, and thereafter, the TMDS decoder 152 receives a video signal in accordance with the EDID compatible with the HDMI 2.x.

Figure 6:
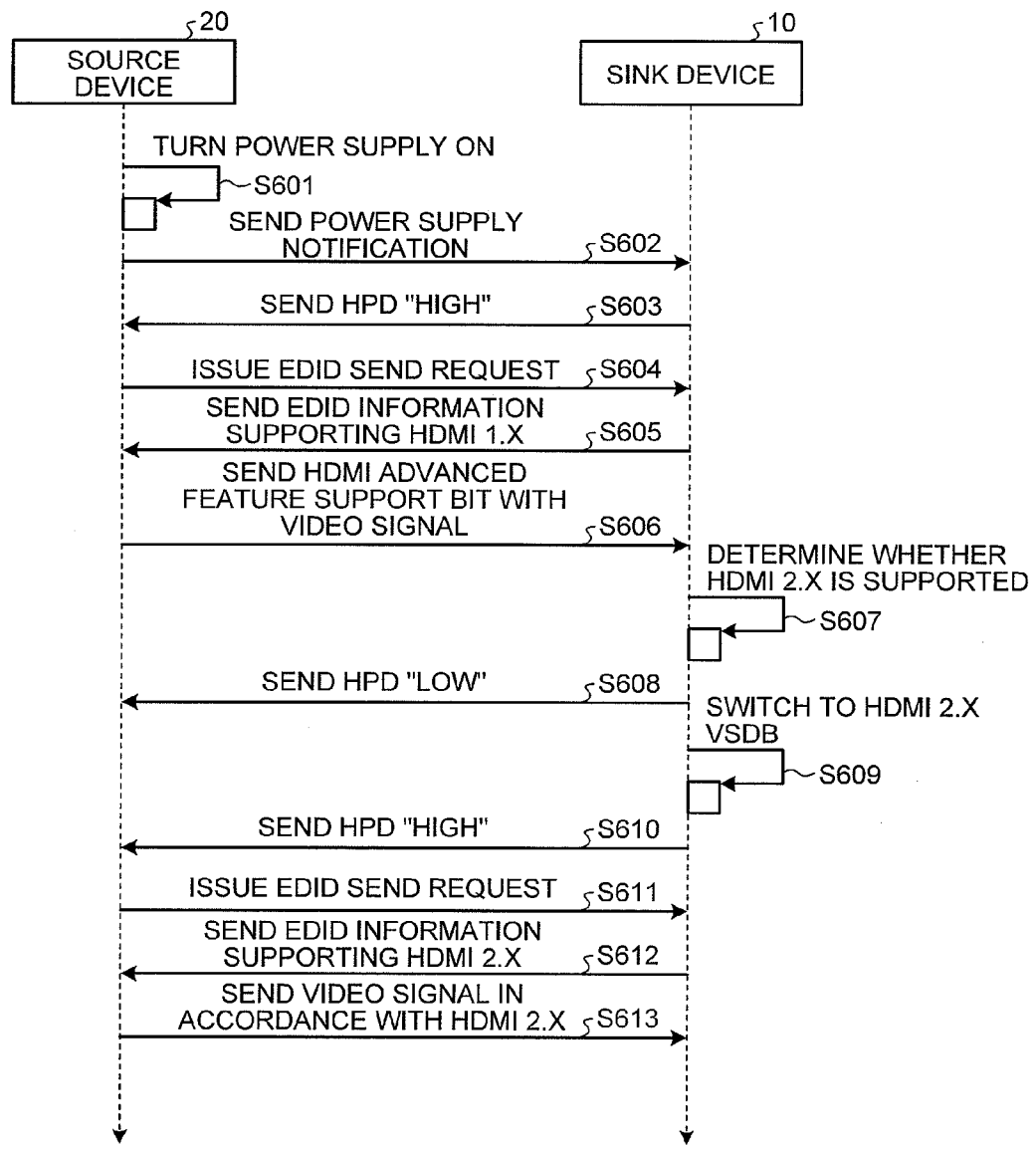
FIG. 6 is an exemplary sequence diagram illustrating a procedure of transmission processing of video signals at a sink device (video display device) and a source device (video transmission device) of the first embodiment.

The following describes transmission processing of video signals at the sink device (video display device 10) and a source device (the video transmission device 20) of the present embodiment. FIG. 6 is a sequence diagram illustrating a procedure of the above-mentioned processing at the sink device and the source device of the present embodiment. In the example illustrated in FIG. 6, a case will be described in which the source device corresponds to the video transmission device 20 and the sink device corresponds to the video display device 10. The source and the sink devices are, however, not limited to these devices, but may be other devices.

First, the power supply of the source device (video transmission device) 20 is turned on (S601). Then, the second communication module 200 of the source device (video transmission device) 20 sends a power supply notification indicating that the power supply is turned on, to the sink device (video display device) 10 (S602).

Then, the sink device (video display device) 10 sends an HPD "High" via the HPD line (S603). This operation allows determination to be made that the sink device 10 has detected the connection of the source device by hot plug.

The second communication module 200 of the source device 20 issues an EDID send request to the first communication module 100 of the sink device 10 (S604). This request causes the EDID transmission controller 154 of the sink device 10 to send the EDID compatible with the HDMI 1.x from the HDMI 1.x VSDB to the source device 20 (S605). In the EDID compatible with the HDMI 1.x, the HDMI advanced feature support bit provided in the reserved area is set to "ON". This setting causes the source device 20 to perform processing corresponding to the HDMI advanced feature support bit "ON".

The source device 20 embeds the InfoFrame with the HDMI advanced feature support bit set to "ON" in an unused area of the video data of the video signal in accordance with the received EDID compatible with the HDMI 1.x, and sends the InfoFrame together with the video signal (S606).

With reference to the InfoFrame, the determination module 151 of the sink device 10 determines whether the source device 20 supports the HDMI 2.x based on whether the HDMI advanced feature support bit is "ON" (S607). This sequence diagram explains an example in which the source device 20 supports the HDMI 2.x.

The communication controller 150 sends an HPD "Low" via the HPD line to cut off the connection (S608). Thereafter, the EDID transmission controller 154 switches the reading source in the memory from the HDMI 1.x VSDB to the HDMI 2.x VSDB (S609).

Thereafter, the communication controller 150 sends the HPD "High" via the HPD line to reconnect the communication (S610).

If the level of the HPD line is detected to be changed from "Low" to "High", the second communication module 200 of the source device 20 issues an EDID send request to the first communication module 100 of the sink device 10 (S611). This request causes the EDID transmission controller 154 of the sink device 10 to send the EDID compatible with the HDMI 2.x from the HDMI 2.x VSDB (S612).

This operation causes the source device 20 to send the video signal in accordance with the EDID 2.x thus sent (S613).

According to the processing procedure described above, the video display device 10 can receive the video signal based on the HDMI 1.x if the source device serving as a transmission source of the video signal does not support the HDMI advanced features, or can receive the video signal based on the HDMI 2.x if the source device supports the HDMI advanced features.

Figure 7:
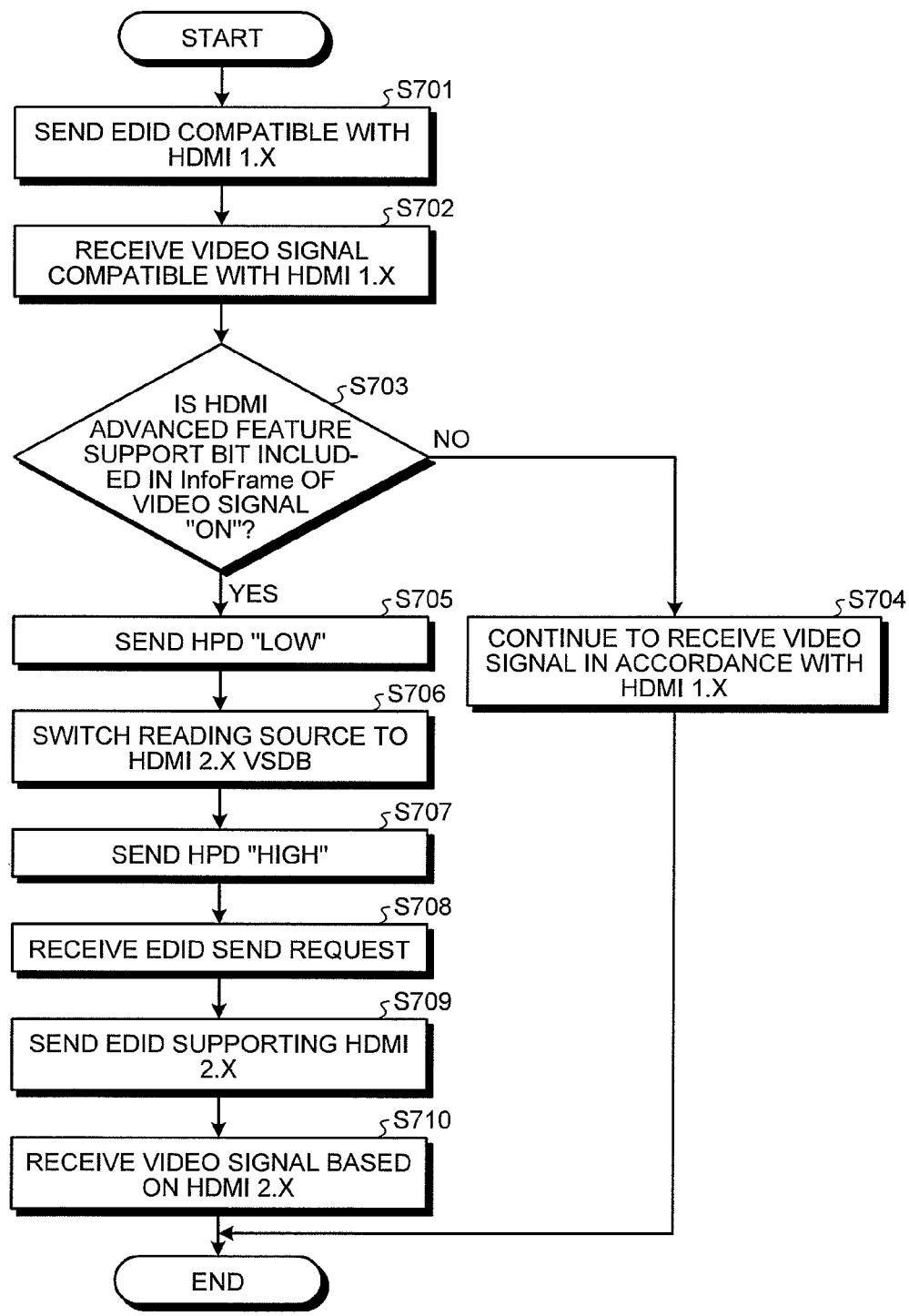
FIG. 7 is an exemplary flowchart illustrating a procedure of processing performed until a video is displayed on the sink device (video display device) of the first embodiment.

The following describes processing performed until the video is displayed on the sink device 10. FIG. 7 is a flowchart illustrating a procedure of the above-mentioned processing on the sink device 10 of the present embodiment. The flowchart illustrated in FIG. 7 represents the procedure after the sink device 10 is connected to the source device 20 by hot plug-in.

First, the EDID transmission controller 154 sends the EDID compatible with the HDMI 1.x to the source device (S701).

Then, the TMDS decoder 152 receives the video signal that is compatible with the HDMI 1.x and is in accordance with the EDID sent at S701 (S702). The determination module 151 determines whether the HDMI advanced feature support bit included in the InfoFrame of the video signal is "ON" (S703). If the HDMI advanced feature support bit is determined to be not "ON" (No at S703), the TMDS decoder 152 continue to receive the video signal in accordance with the HDMI 1.x (S704).

If the determination module 151 determines that the HDMI advanced feature support bit is "ON" (Yes at S703), the communication controller 150 sends the HPD "Low" via the HPD line (S705). Thereafter, the EDID transmission controller 154 switches the reading source in the memory from the HDMI 1.x VSDB to the HDMI 2.x VSDB (S706).

Then, the communication controller 150 sends the HPD "High" via the HPD line to the source device 20 (S707). This operation leads to the reconnection between the source device 20 and the sink device 10. As a result, the EDID processing module 153 receives the EDID send request from the source device 20 (S708).

Thereafter, the EDID transmission controller 154 sends the EDID compatible with the HDMI 2.x (S709). The TMDS decoder 152 receives the video signal based on the HDMI 2.x from the source device 20 (S710).

In the first embodiment, the case has been described in which the video transmission device 20 is selected as an output source of the video signal. The video display device 10 can, however, select a video signal to be displayed from those obtained via the connection interfaces (the input terminal 111, the HDMI ports 121 and 122, and the connector 123). Accordingly, in the second embodiment, a description will be given of a case of selecting a video signal to be displayed.

The input module 19 of the second embodiment accepts a selection of a video signal that serves as a display target from those obtained via the connection interfaces. For example, the input module 19 accepts a selection of a video signal to be received each time an "input switch" button of a remote controller (not illustrated) is pressed.

Figure 8:
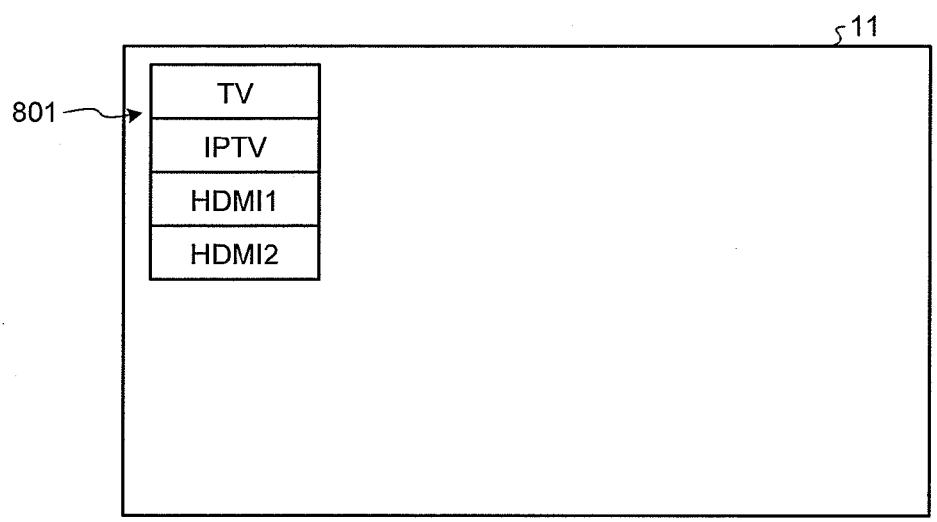
FIG. 8 is an exemplary diagram illustrating a screen displayed by a display when an input module has accepted information indicating that an "input switch" button is pressed on a remote controller according to a second embodiment.

FIG. 8 is a diagram illustrating a screen example displayed by the display 11 when the input module 19 has accepted information indicating that the "input switch" button is pressed on the remote controller. As illustrated in FIG. 8, the display 11 displays selection items 801 for displaying video signals received from the connection interfaces.

If an HDMI port ("HDMI 1" or "HDMI 2" in FIG. 8) for receiving a video signal is selected from those of the connection interfaces by the input module 19, the display 11 displays information indicating that the HDMI is selected and the video data received via the HDMI port.

Figure 9:
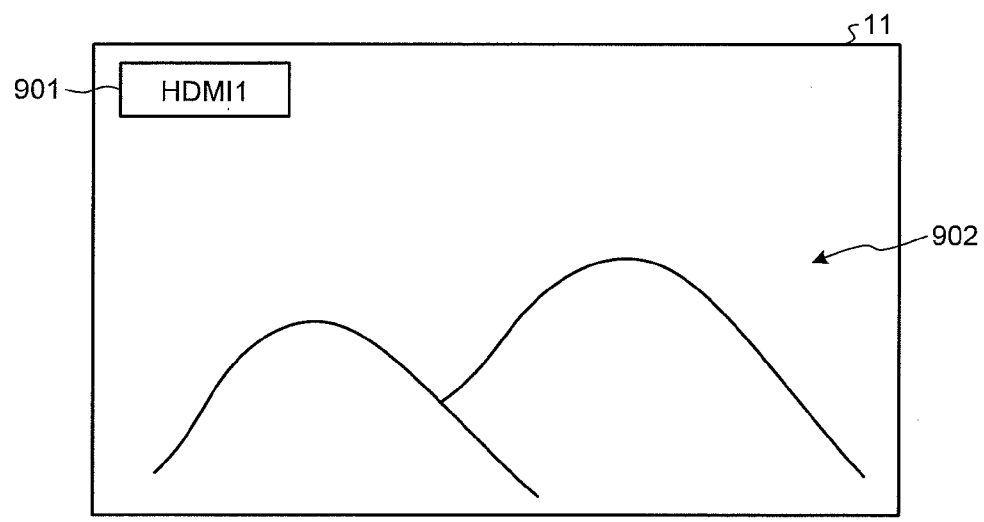
FIG. 9 is an exemplary diagram illustrating a screen example displayed by the display of the second embodiment.

FIG. 9 is a diagram illustrating a screen example displayed by the display 11. As illustrated in FIG. 9, the display 11 displays information "HDMI 1" 901 indicating that the video is received via the HDMI port and a video 902 received via the HDMI port represented as "HDMI 1". This information allows a user to know from the displayed screen that the video is received via the selected HDMI 1 port.

In some cases, the video display device 10 comprising the connection interfaces also receives a video signal via a connection interface (HDMI port) not displayed on the display 11. In the case in which the video signal is received via the HDMI port, the same processing as that of the first embodiment has been performed when the devices are connected to each other, so that the advanced feature support bit is stored in the InfoFrame.

The present embodiment does not analyze the InfoFrame to determine whether the connection counterpart supports the HDMI advanced features (such as the HDMI 2.x) until the HDMI port (connection interface) 121 or 122 for outputting the video signal is selected. This configuration can reduce a processing load when the HDMI port is not selected.

Figure 10:
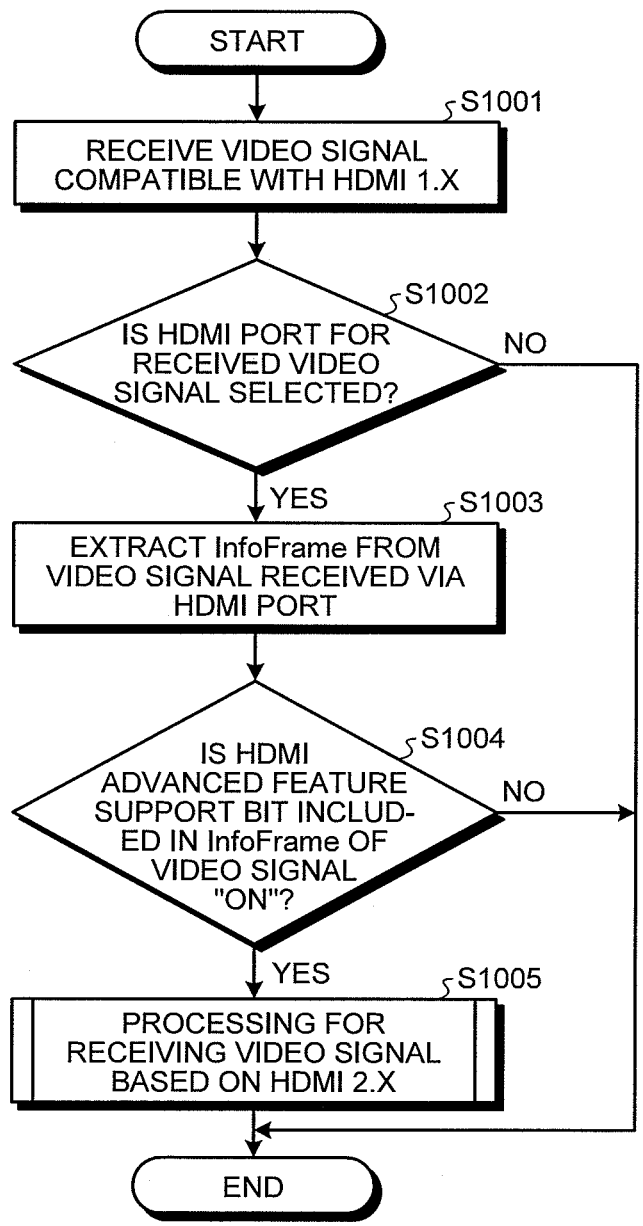
FIG. 10 is an exemplary flowchart illustrating a processing procedure of video signals received from an HDMI port of a video display device in the second embodiment.

The following describes a processing procedure of a video signal received via the HDMI port (connection interface) 121 or 122 of the video display device 10 according to the present embodiment. FIG. 10 is a flowchart illustrating the above-mentioned processing procedure of the video display device 10 according to the present embodiment. In the example illustrated in FIG. 9, a connection is completed between the video display device 10 and the video transmission device 20 via the HDMI port (connector) 121 or 122, and the EDID compatible with the HDMI 1.x has been sent.

First, the TMDS decoder 152 in the first communication module 100 of the video display device 10 receives the video signal compatible with the HDMI 1.x from the video transmission device 20 connected to the video display device 10 via the HDMI port (connector) 121 or 122 (S1001).

Then, the TDMS decoder 152 determines whether the HDMI port for the received video signal is selected as a display source by the input module 19 (S1002). If the HDMI port is determined to be not selected (No at S1002), the process ends without further processing.

If the HDMI port for the received video signal is determined to be selected as a display target by the input module 19 (Yes at S1002), the TDMS decoder 152 extracts the InfoFrame from the video signal received via the HDMI port (connector) (S1003). The determination module 151 determines whether the HDMI advanced feature support bit included in the InfoFrame of the video signal is "ON" (S1004). If the HDMI advanced feature support bit is determined to be not "ON" (No at S1004), the video signal compatible with the HDMI 1.x continues to be received, and the process ends.

If the determination module 151 determines that the HDMI advanced feature support bit included in the InfoFrame of the video signal is "ON" (Yes at S1004), the video display device 10 performs the processing for receiving the video signal based on the HDMI 2.x (S1005). The processing illustrated at S705 to S710 in FIG. 7 is performed as the processing for receiving the video signal, so that the description thereof is omitted.

The present embodiment performs the processing according to the processing procedure described above. Thus, if an HDMI port is not selected by the input switch, the present embodiment does not extract an InfoFrame from a video signal and hence does not switch the HDMI to the HDMI 2.x even if the video signal including the InfoFrame with the HDMI advanced feature support bit set to "ON" has been received. This configuration can reduce the processing load.

In this manner, if a selection of an HDMI port has not been accepted by the input module 19, the EDID transmission controller 154 of the present embodiment does not send the EDID compatible with the HDMI 2.x even if the video signal including the InfoFrame with the HDMI advanced feature support bit set to "ON" has been received from the video transmission device 20 connected to the HDMI port.

Provided that an HDMI port among those of the connection interfaces is selected by the input module 19, the EDID transmission controller 154 once changes the level of the HPD line from "High" to "Low" and returns the level again to "High" so that the video transmission device 20 connected to the HDMI port rereads the EDID and sends the EDID compatible with the HDMI 2.x.

In the second embodiment, the example has been described in which, if a video signal from the video transmission device 20 is not selected as a display target to be displayed on the display 11, the analysis or the like is not applied (processing, such as the extraction of the InfoFrame, is not applied) to the video signal, and the EDID compatible with the HDMI 2.x is not sent even if the video signal including the InfoFrame with the HDMI advanced feature support bit set to "ON" has been received.

However, the method is not limited to such a method in which the analysis or the like is applied after the video signal is selected as a display target, and the present invention is not limited to the example in which the analysis or the like is not applied (processing, such as the extraction of the InfoFrame, is not applied) to the video signal from the video transmission device 20 that is not selected as a display target to be displayed on the display 11.

As a modification, if a video signal is received, the TDMS decoder 152 extracts the InfoFrame from the video signal received via the HDMI port, and the determination module 151 determines whether the HDMI advanced feature support bit is selected, regardless of whether the HDMI port is selected as a display target by the input module 19. If the determination is made that the HDMI advanced feature support bit is selected, the processing for sending the EDID compatible with the HDMI 2.x is not performed unless the HDMI port is selected as a display target by the input module 19.

Provided that the HDMI port is selected by the input module 19, the first communication module 100 performs the processing for sending the EDID compatible with the HDMI 2.x based on the result of the determination already made by the determination module 151 before the selection.

In the second embodiment and the modification thereof, the example has been described in which, if a connection interface (HDMI port) is not selected, the EDID compatible with the HDMI 2.x is not sent to a video transmission device connected to the HDMI port. The method is, however, not limited to the method in which the EDID compatible with the HDMI 2.x is not sent unless the HDMI port is selected. Hence, in a third embodiment of the present invention, an example will be described in which the EDID compatible with the HDMI 2.x is sent even if the connection interface (HDMI port) is not selected.

In the third embodiment, if a video signal is received, the TMDS decoder 152 extracts the InfoFrame from the video signal received via the HDMI port, regardless of whether the HDMI port is selected by the input module 19. The determination module 151 determines whether the HDMI 2.x is supported, with reference to the HDMI advanced feature support bit of the InfoFrame. If the HDMI 2.x is determined to be supported, the first communication module 100 performs the processing for sending the EDID compatible with the HDMI 2.x regardless of whether the HDMI port is selected as a display target by the input module 19. The processing is the same as that of the first embodiment, so that the description thereof is omitted. The processing performed before the HDMI port is selected by the input module 19 allows the video signal compatible with the HDMI 2.x to be received immediately after the input module 19 selects the HDMI port.

In the embodiments described above, the example has been described in which the EDID and the InfoFrame are used to determine whether the video transmission device supports the HDMI 2.x. The embodiments are, however, not limited to the case of using the EDID and the InfoFrame to determine whether the video transmission device supports the HDMI 2.x. As another method, the CEC may be used to make the notification. Specifically, at S606, the source device 20 may send a CEC message command indicating that the HDMI 2.x is supported, and the sink device 10 may analyze the received CEC message to determine whether the source device supports the HDMI 2.x. Furthermore, at S605, the sink device 10 may send a CEC message in which a bit indicating that the HDMI 2.x is supported is included, instead of sending the EDID in which the bit indicating that the HDMI 2.x is supported is included.

According to the embodiments described above, in the case of connecting a device supporting the advanced features of the HDMI to a device not supporting the advanced features thereof, the connection is first established without using the advanced features, so that interconnectivity therebetween can be maintained. Devices supporting the advanced features are reconnected to each other after mutually identifying that the advanced features are supported, and thus can use the advanced features. As a result, the advanced features can be used, and also, the interconnectivity can be achieved.

In the embodiments described above, the case has been described in which the HDMI advanced features are those of the HDMI 2.x. The advanced features are, however, not limited to those of the HDMI 2.x, but may be, for example, those of the HDMI 3.x.

Moreover, the various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic device comprising:
    a memory configured to store therein first extended display identification data (EDID) and second EDID comprising a different version of the High-Definition Multimedia Interface (HDMI) from the first EDID;
    a receiver configured to receive a video signal from another electronic device; and
    a transmitter configured to send the first EDID comprising an identification bit to the another electronic device, the another electronic device being configured to respond to the identification bit when the another electronic device supports the version of the HDMI of the second EDID, and to send the second EDID to the another electronic device when the receiver has received a response corresponding to the identification bit from the another electronic device.

2. The electronic device of claim 1, further comprising a controller configured to reconnect communication with the another electronic device using an HPD function when the receiver has received the response corresponding to the identification bit, wherein
    the transmitter is configured to send the second EDID to the another electronic device after the controller has established the reconnection.

3. The electronic device of claim 1, wherein the memory is configured to store therein the first EDID of the HDMI version that is compatible with a HDMI Version 1.x and the second EDID of the HDMI version that is compatible with a HDMI Version 2.x.

4. The electronic device of claim 1, wherein the receiver is configured to receive a video signal that includes the response corresponding to the identification bit and that is in accordance with the first EDID, and to receive a video signal in accordance with the second EDID after the transmitter has sent the second EDID.

5. The electronic device of claim 1, further comprising:
    a plurality of connection interfaces;
    an input configured to receive a selection of a display target from the connection interfaces; and
    a display configured to display, when an HDMI port connected to the another electronic device is selected from among the connection interfaces, information indicative of the HDMI port being selected and the video signal received via the HDMI port.

6. The electronic device of claim 1, further comprising:
    a plurality of connection interfaces; and
    an input configured to receive a selection of a display target from the connection interfaces, wherein
    the transmitter is configured not to send the second EDID to the another electronic device connected to an HDMI port when a selection of the HDMI port from among the connection interfaces has been received by the input, even when the response corresponding to the identification bit is received from the another electronic device.

7. The electronic device of claim 6, wherein the transmitter is configured to send the second EDID to the another electronic device connected to the HDMI port provided that the selection of the HDMI port from among the connection interfaces has been received by the input.

8. The electronic device of claim 1, further comprising:
    a plurality of connection interfaces; and
    an input configured to receive a selection of a display target from the connection interfaces, wherein
    the transmitter is configured to send the second EDID to the another electronic device connected to an HDMI port even when a selection of the HDMI port from among the connection interfaces has not been received by the input, when the response corresponding to the identification bit is received from the another electronic device.

* * * * *